W. F. HESSEL.
ELECTRICAL SWITCH DEVICE.
APPLICATION FILED AUG. 11, 1919.
Reissued Sept. 21, 1920. 14,950.
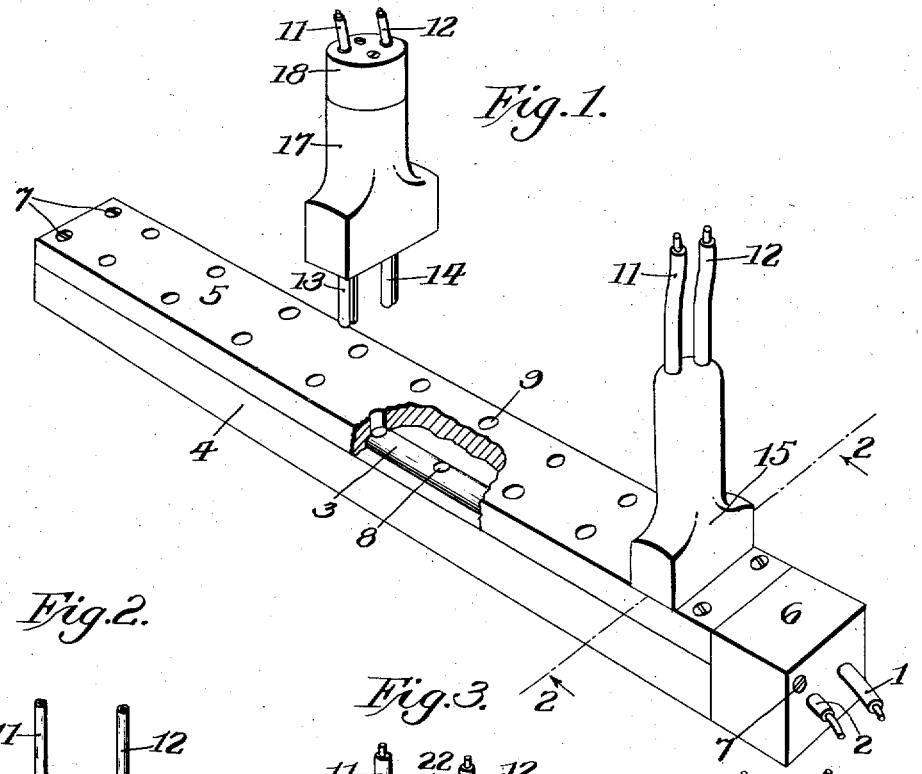
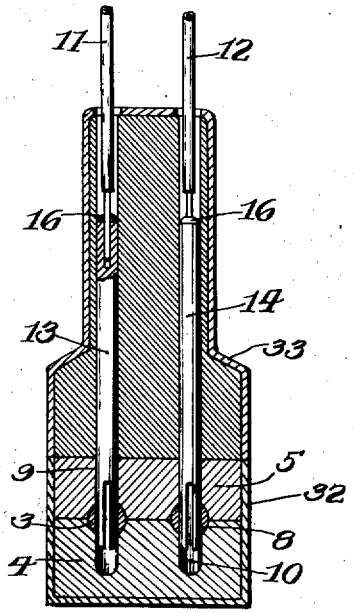
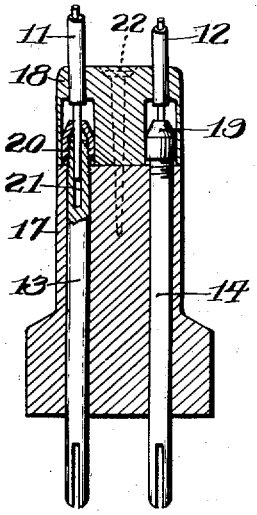
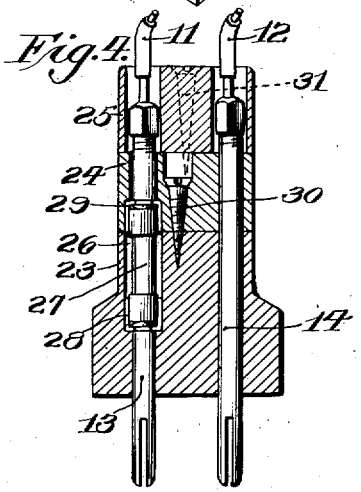
Inventor
William F. Hessel
By Walter P. Hammond
Attorney

UNITED STATES PATENT OFFICE.

WILLIAM F. HESSEL, OF NEW YORK, N. Y.

ELECTRICAL SWITCH DEVICE.

14,950. Specification of Reissued Letters Patent. Reissued Sept. 21, 1920.

Original No. 1,296,801, dated March 11, 1919, Serial No. 185,026, filed August 8, 1917. Application for reissue filed August 11, 1919. Serial No. 316,923.

*To all whom it may concern:*

Be it known that I, WILLIAM F. HESSEL, a citizen of the United States, residing in the county, city, and State of New York, have invented certain new and useful Improvements in Electrical Switch Devices, of which the following is a specification.

My invention relates more particularly to electrical switch devices for connecting a plurality of branch lines to a main feed circuit in a convenient and expeditious manner.

An embodiment of the principles of my invention, designed for particular use in connection with the ship building industry, wherein it has been found desirable to provide a plurality of extension lights for affording illumination for separated portions of a ship's interior during its construction is illustrated in the accompanying drawing. To meet these requirements it has been found desirable to provide an arrangement of switches of a portable character enabling a ready positioning and change of position as needed. Furthermore it is desirable to afford accommodation for a maximum number of extension lighting circuits which may be quickly connected in the main circuit as circumstances may require.

It is also desirable that the entire conducting parts of the switching instrumentalities be amply insulated and of such rugged construction as will withstand rough usage in the hands of workmen engaged in the form of occupation mentioned.

The main object therefore of my invention has been to meet the requirements set forth by a device which is of simple and inexpensive construction and which possesses that desirable high degree of insulation, which is required by the nature of such devices.

In the accompanying drawings, I have illustrated by way of example certain preferred embodiments of the principles of my invention in which:—

Figure 1 is a view in perspective of a portable switching unit partly broken away to show the interior construction and also illustrates in connection therewith a pair of detachable switch plugs which carry the extension lights.

Fig. 2 is a view in vertical cross section taken on line 2—2 of Fig. 1, to which has been added a sheet metal steel protecting housing.

Figs. 3 and 4 are cross section views respectively of modified forms of detachable switch plugs.

Referring to Fig. 1, the feed wires of the main circuit are indicated by the numerals 1 and 2 each of which is detachably connected to a conducting bus bar 3. These bus bars are in the illustrated embodiment two in number and are arranged in parallel relation to each other within a segmental insulating block comprising parts 4, 5 and 6. This insulating block may be formed of any suitable insulating material such as hard rubber, substitute composition or even wood; of the latter I have found maple to be highly suitable for the purpose. These sections are grooved to accommodate the bus bars in such a manner as to entirely surround and insulate them, the sections being fastened together by means of screws 7 or other suitable fastening means. In the case of using a molded composition it is manifest that the bars will be molded in place within a unitary block of the insulating material.

The bus bars are perforated at 8 these holes being equally spaced at intervals for the accommodation of the split terminals of the detachable plugs which coöperate therewith to cut in the extension lighting circuits. The insulating block is likewise provided with perforations 9, and 10 (see Figs. 1 and 2) in alinement with the perforations of the bus bars to enable these various connections to be accomplished.

The switch unit is formed in rectangular shape as shown so as to enable it to rest upon its own base assuming an upright position with the attached plugs, thus not necessitating the fastening of it to a support. In this way the unit may be quickly transported from place to place as necessary or found desirable.

The number of auxiliary extension lighting circuits accommodated by the bus bar unit may vary according to requirements. It is desirable, however, to afford means for connecting the maximum number necessary in a particular case and in this way the usefulness and flexibility of the unit is enhanced.

The afforded illumination for workmen at separated points within the hull of a ship under construction is accomplished by use of the detachable plugs illustrated. Wires 11 and 12 of each plug are connected at one extremity with the lamp (not shown) while the other extremity (referring to Fig. 2) is fastened to one of the conducting members 13 and 14 respectively, these members being embedded and held rigidly within the insulating block 15 with their split extremities extending therefrom to coöperate with the alined apertures in the bus bar and its insulating covering.

The plug (see Fig. 2) is provided with a reduced upper portion to form a hand grip to make manipulation easy.

The block as shown in Fig. 2 is of integral construction, the wires being soldered to the conducting members 13 and 14 before the latter are positioned therein. The members are held by a driving fit or other suitable means.

In order to make convenient the attaching and detaching of the wires and conducting members I may form the plug block in two sections 17 and 18 (see Fig. 3) in which case I provide a socket in the member 18 to accommodate a detachable sleeved device 19 having screw threaded engagement at 20 with the upper extermity of the conducting member. Each conducting member is provided with an axial hole 21 for the accommodation of the bared portion of the wire as shown.

The screw threaded upper extremity of the conducting member is split so that the sleeve 19 when screwed down will cause the walls of the member to firmly grip the wire and hold it in place. Of course any other suitable detachable connecting means may be employed to equal advantage and I therefore do not desire to be limited to the particular means shown. The sections 17 and 18 are fastened together by means of a screw 22 or other equivalent fastening device.

In order to fuse the extension circuit in a convenient and satisfactory manner I afford accommodation for a fuse of the cartridge type within the insulating body of the plug. In Fig. 4, the handle is shown in sectional form comprising sections 23, 24 and 25. Within sections 23 and 24 is formed a cavity 26 of suitable dimensions to accommodate the cartridge fuse 27. To hold the fuse in place I provide the conducting member 13 which in this instance is bisected into two parts, with the cup shaped receptacles 28 and 29 suitably fastened thereto and of metal having sufficient spring to form close contact with the ends of the fuse. The member 23 is fastened to the member 24 by means of the screw 30, while the member 25 is fastened to the member 24 by the screw 31 these being out of alinement so as not to interfere with one another when the plug is assembled. It is apparent that by unloosening the screw 31 the member 25 can be slid along the wires so that the wires 11 and 12 may be conveniently disconnected from the conducting members 13 and 14. By unloosening the screw 30 and removing this section access can be had to the fuse for inspection or replacement as found to be necessary.

In order to increase the ruggedness of the bus bar strip or unit and the separable plugs I provide them with sheet metal inclosing housings 32 and 33. (See Fig. 2). These sheet metal coverings enable the device to withstand greater accidental abuse and are particularly desirable when insulation of brittle or easily destroyed character is used.

While I have illustrated my invention as applied to a two wired system manifestly the principle thereof is applicable to a three or more wired system, mere duplication of the conducting parts being necessary.

While I have illustrated in the accompanying drawings preferred embodiments of the principles of my invention I have done so in an illustrative rather than a definite sense and I therefore desire to cover by the appended claims those principles in whatever form they may find embodiment.

Having thus described my invention what I claim as new and desire to secure by Letters Patent is:—

1. A portable multiple tap switch base including a pair of spaced and substantially parallel metal bus bars which have a solid formation and are of uniform cross section from end to end, said bus bars being provided at corresponding intervals throughout their length with transversely disposed parallel openings, and an elongated substantially rectangular insulating block formed of tough material and adapted to be shifted from place to place, said block completely housing the bus bars and being divided longitudinally into complemental sections which fit against the same from opposite sides, openings being provided in the block which register with apertures of the bus bars and are adapted to direct the conducting arms of a detachable plug into the apertures of the bus bars, the base of the block being flat and serving to support the block in an upright position when it rests loosely upon a supporting surface.

2. A portable switch base including a pair of spaced and substantially parallel bus bars which have a solid formation and are of uniform cross section from end to end, said bus bars being provided at corresponding intervals throughout their length with transverse openings, and an elongated flat based insulating block housing the bus bars and shielding them from engagement with any exterior object, said block being divided longitudinally into complemental sections which are fitted against the bus bars from opposite sides thereof, and being formed with openings registering with the apertures of the bus bars and adapted to direct the conducting arms of a detachable plug into engagement with the said apertures, an end block fitted against one end of the elongated insulating block and secured to the complemental sections thereof, and insulated wires entering the end block and detachably connected to the bus bars.

3. A portable multiple tap switch base including a pair of spaced and substantially parallel metal bus bars, said bus bars being provided at corresponding intervals throughout their length with transversely disposed parallel openings, and an elongated substantially rectangular insulating block formed of tough material and adapted to be shifted from place to place, said block completely housing the bus bars and being divided longitudinally into complemental sections which fit against the same from opposite sides, openings being provided in the block which register with the apertures of the bus bars and are adapted to direct the conducting arms of a detachable plug into the apertures of the bus bars, the base of the block being flat and serving to support the block in an upright position when it rests loosely upon a supporting surface.

4. A portable switch base including a pair of spaced and substantially parallel bus bars of substantially uniform cross section from end to end, said bus bars being provided at corresponding intervals throughout their length with transverse openings and an elongated flat based insulating block housing the bus bars and shielding them from engagement with any exterior object, said block being divided longitudinally into complemental sections which are fitted against the bus bars from opposite sides thereof, and being formed with openings registering with the apertures of the bus bars and adapted to direct the conducting arms of a detachable plug into engagement with the said apertures, an end block fitted against one end of the elongated insulating block and secured to the complemental sections thereof, and insulated wires entering the end block and detachably connected to the bus bars.

5. A portable tap switch base constituting a complete independent working unit free from means for operatively connecting it to a like unit, said switch base including a rigid housing of insulating material having parallel openings formed therein, and a plurality of substantially parallel electrical conductors provided with parallel openings and positioned within and entirely inclosed by said housing and terminating short of the extremities of the housing whereby there are no exposed conducting parts, the openings in said housing registering with the openings in said conductors and adapted to direct the conducting members of a detachable plug into the openings in said conductors, said switch base being free from any exposed conducting parts.

6. A portable tap switch base constituting a complete independent working unit free from means for operatively connecting it to a like unit, said switch-base including a rigid housing of insulating material having longitudinally extending parallel recesses formed therein, said recesses being of substantially uniform cross-sectional area throughout their length and having their longitudinal and end walls spaced from the longitudinal and end walls of said housing, and metal bars positioned within and concealed by said recesses and provided with holes, said housing having openings formed therein communicating with said recesses and registering with the holes in said bars and adapted to direct the conducting member of a detachable plug into the holes in said bars, said switch base being free from any exposed conducting parts.

WILLIAM F. HESSEL.